US011842376B2

(12) United States Patent
Rodriguez et al.

(10) Patent No.: US 11,842,376 B2
(45) Date of Patent: Dec. 12, 2023

(54) METHOD, MEDIUM, AND SYSTEM FOR DATA LOOKUP BASED ON CORRELATION OF USER INTERACTION INFORMATION

(71) Applicant: Toshiba Global Commerce Solutions Holdings Corporation, Tokyo (JP)

(72) Inventors: Adrian Rodriguez, Durham, NC (US); Susan W. Brosnan, Raleigh, NC (US); Brad M. Johnson, Raleigh, NC (US); Stacy Arrington, Morrisville, NC (US); David Steiner, Raleigh, NC (US); Phillip Monkowski, Apex, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 17/359,502

(22) Filed: Jun. 25, 2021

(65) Prior Publication Data

US 2022/0414733 A1    Dec. 29, 2022

(51) Int. Cl.
*G06Q 30/00*    (2023.01)
*G06Q 30/0601*    (2023.01)

(52) U.S. Cl.
CPC ..... *G06Q 30/0623* (2013.01); *G06Q 30/0633* (2013.01); *G06Q 30/0639* (2013.01)

(58) Field of Classification Search
CPC .......... G06Q 30/0623; G06Q 30/0633; G06Q 30/0639; G06Q 20/20; G06Q 20/18; G06V 10/10; G06V 10/40; G07G 1/0045
See application file for complete search history.

(56) References Cited

U.S. PATENT DOCUMENTS

| | | | | |
|---|---|---|---|---|
| 7,845,554 B2* | 12/2010 | Jacobs | .................. | G06Q 20/20 235/383 |
| 7,987,491 B2* | 7/2011 | Reisman | ............ | H04N 21/8583 725/86 |
| 8,433,621 B2* | 4/2013 | Linden | ............... | G06Q 30/0271 705/26.7 |
| 10,176,677 B2* | 1/2019 | Herring | .................. | G07G 3/003 |
| 2011/0320322 A1* | 12/2011 | Roslak | ................. | G06Q 10/087 705/28 |
| 2016/0019514 A1* | 1/2016 | Landers, Jr. | ......... | G06Q 20/202 705/23 |

(Continued)

FOREIGN PATENT DOCUMENTS

CN    102132300 B    2/2018

OTHER PUBLICATIONS

Pinto-Coelho, Lise W., William L. Hand, and Andrew T. Rothstein. An Analysis of Retail Self-Checkout Systems for the Defense Commissary Agency. Logistics Management Inst Mclean VA (Year: 1996).*

(Continued)

*Primary Examiner* — Matthew E Zimmerman
(74) *Attorney, Agent, or Firm* — Patterson + Sheridan, LLP

(57) ABSTRACT

The present disclosure provides techniques for curating search results. A first request to look up an identifier for an item is received from a first user, and first tracking information corresponding to movements of the first user in a physical space is retrieved. At least one item associated with the first user while moving in the physical space is identified from the first tracking information. A first identifier of the at least one item is determined, and the first identifier is provide to the first user.

20 Claims, 6 Drawing Sheets

(56) References Cited

U.S. PATENT DOCUMENTS

| | | | | |
|---|---|---|---|---|
| 2016/0203499 | A1* | 7/2016 | Yamashita | G06V 20/52 |
| | | | | 705/7.29 |
| 2017/0076698 | A1* | 3/2017 | Naito | G06Q 20/20 |
| 2017/0249491 | A1* | 8/2017 | MacIntosh | G06V 20/20 |
| 2017/0280290 | A1* | 9/2017 | Jones | G06Q 30/0641 |
| 2018/0314991 | A1* | 11/2018 | Grundberg | G06Q 10/047 |
| 2020/0380226 | A1* | 12/2020 | Rodriguez | G06V 10/147 |

OTHER PUBLICATIONS

Bobbit, Russell, et al. "Visual item verification for fraud prevention in retail self-checkout." 2011 IEEE Workshop on Applications of Computer Vision (WACV). IEEE, 2011. (Year: 2011).*

Liam Griffin, "How to Improve Custom Search in Your Clients' Storefronts," Shopify Partners, dated Oct. 5, 2020.

* cited by examiner

METHOD, MEDIUM, AND SYSTEM FOR DATA LOOKUP BASED ON CORRELATION OF USER INTERACTION INFORMATION

BACKGROUND

The present disclosure relates to data lookup, and more specifically, to using user interaction and movement information to facilitate improved data lookup.

Self-service retail environments (e.g., self-checkout) have become increasingly common in a wide variety of establishments. Typically, these systems are designed to be largely autonomous, needing minimal oversight from employees. Additionally, there has been increasing effort to further reduce friction in retail environments, such as by automatically identifying items selected by the customer (e.g., placed in a cart or basket). For example, the system may use cameras or other sensors to identify objects being selected.

However, such systems are inherently inaccurate in a wide variety of common environments or contexts, and commonly cannot distinguish between similar items. Further, existing vision-based systems require substantial computing resources. As such, existing systems largely rely on manual user input to identify relevant items.

SUMMARY

According to one embodiment of the present disclosure, a method is provided. The method includes receiving, from a first user, a first request to look up an identifier for an item; retrieving first tracking information corresponding to movements of the first user in a physical space; identifying, from the first tracking information, at least one item associated with the first user while moving in the physical space; and determining a first identifier of the at least one item; and providing the first identifier to the first user.

According to a second embodiment of the present disclosure, a computer-readable storage medium is provided. The computer-readable storage medium contains computer program code that, when executed by operation of one or more computer processors, performs an operation. The operation includes receiving, from a first user, a first request to look up an identifier for an item; retrieving first tracking information corresponding to movements of the first user in a physical space; identifying, from the first tracking information, at least one item associated with the first user while moving in the physical space; and determining a first identifier of the at least one item; and providing the first identifier to the first user.

According to a third embodiment of the present disclosure, a system is provided. The system includes one or more computer processors, and a memory containing a program which, when executed by the one or more computer processors, performs an operation. The operation includes receiving, from a first user, a first request to look up an identifier for an item; retrieving first tracking information corresponding to movements of the first user in a physical space; identifying, from the first tracking information, at least one item associated with the first user while moving in the physical space; and determining a first identifier of the at least one item; and providing the first identifier to the first user.

DETAILED DESCRIPTION

Figure 1:
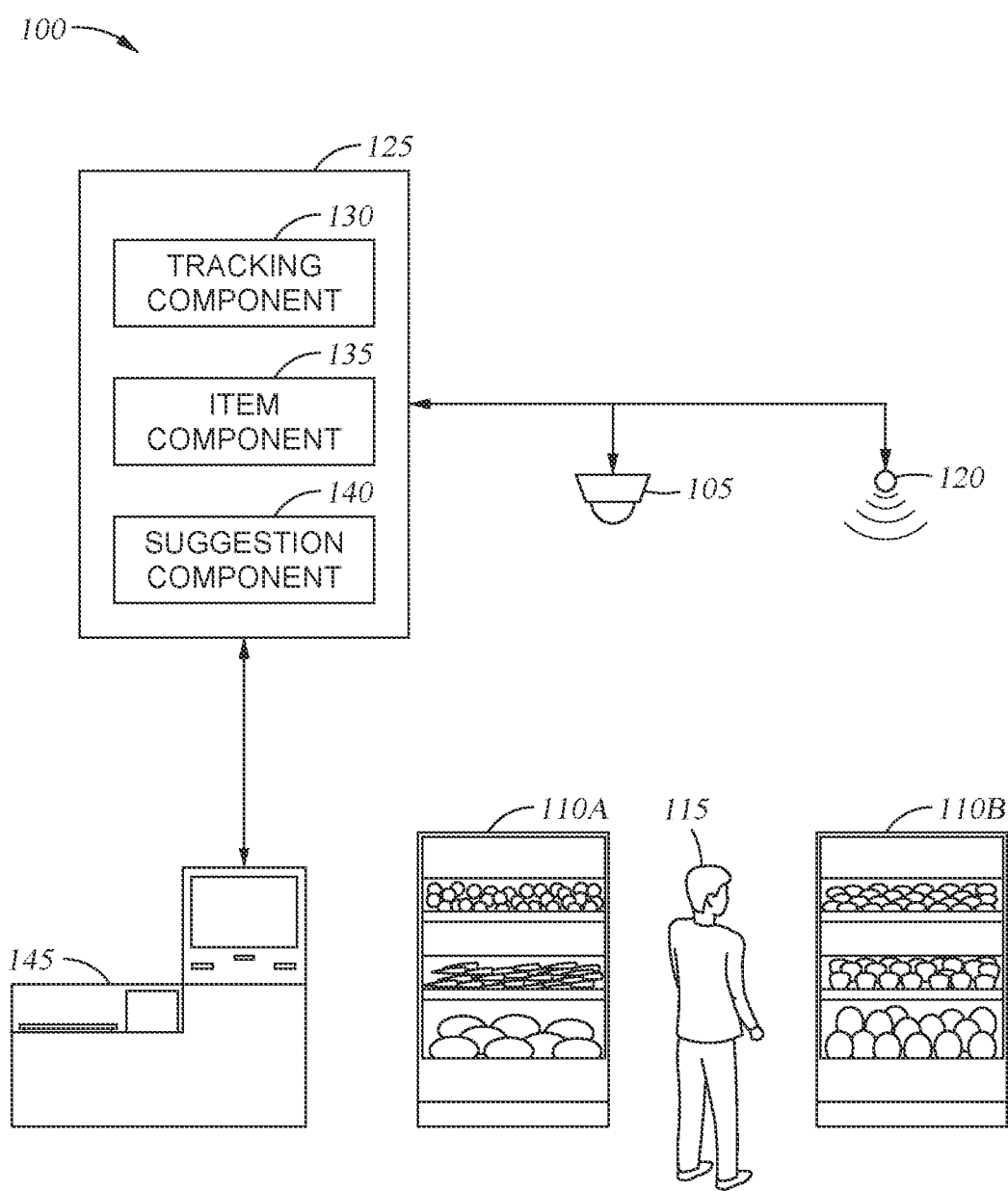
FIG. 1 illustrates an environment configured to automatically monitor user movement and interactions to facilitate data lookup, according to one embodiment disclosed herein.

Embodiments of the present disclosure provide techniques to improve data lookup based on user tracking information.

In some embodiments, the movement and interactions of one or more users (e.g., customers) are tracked within a physical environment (e.g., a retail store), allowing the system to determine and/or infer the item(s) or object(s) each user interacts with. The system may subsequently use the collected tracking data to facilitate item lookup, such as by prioritizing particular items, filtering possible items, and/or sorting the lookup results. Though existing systems are typically unsorted or may prioritize frequently-selected items, the activity of the individual user is not considered.

Although retail product lookup is used in some examples discussed here, aspects of the present disclosure are readily applicable to data lookup based on tracking information in a wide variety of implementations and environments. For example, aspects of the present disclosure may be used to aid item lookup in a warehouse where employees retrieve items or objects for processing or shipping.

Embodiments of the present disclosure can allow the system to automatically identify the most likely items that the user desires to input, which significantly improves the functioning of the system, as well as the user experience. For example, manual product lookup (such as by searching by product name) used in existing systems is slow and prone to inaccuracies. Further, other approaches such as vision-based lookup systems are computing resource intense. Embodiments of the present disclosure enable more accurate data analysis and resulting predictions without requiring intensive computing resources. Further, by automatically identifying the most likely desired items, resources needed to perform item lookup are lower and the overall latency of data lookup, confirmation, and entry is significantly reduced.

In embodiments, the tracking information can be collected using a variety of techniques. For example, in some embodiments, the system can use cameras or other imaging sensors, beacons, global or local positioning system(s), application(s) on the user devices, and the like to monitor movement and interactions of each user. As additional examples, the system may track the barcodes scanned by the user, items touched with or searched for (e.g., using an application on the user's device), items included in a list authored by the user (e.g., a shopping list), and the like.

In an embodiment, when a user desires to search for an item identifier (e.g., using a "product lookup" search option at checkout), the system can identify the user, retrieve the relevant tracking information, determine which items the user may be searching for based on the tracking information (e.g., based on determining that the user lingered near a particular item, picked up an item, checked an item off of their shopping list, and the like). In some embodiments, the system may filter the possible items based on the tracking information, sort them (e.g., presenting the most likely items first), and the like. The filtered, sorted, or otherwise curated list can then be presented to the user.

In some aspects, the system can additionally or alternatively perform the data lookup based, in part, on affirmative input from the user. For example, the user may verbally or textually specify to add a category of items (e.g., "add apples") and the system may use the collected tracking information to identify, from a list of all items fitting the category (e.g., all apples available in the store), the particular type of apples the user is likely requesting.

FIG. 1 illustrates an Environment 100 configured to automatically monitor user movement and interactions to facilitate data lookup, according to one embodiment disclosed herein. In the illustrated example, the Environment 100 corresponds to a retail environment (e.g., a grocery store) where users (e.g., customers) can select items they wish to purchase. In other embodiments, the Environment 100 can include any other physical space, including, for example, a warehouse where employees retrieve items or objects for shipping, and the like.

In the illustrated example, the Environment 100 includes a Camera 105 used to monitor Users 115 in the space. Although a Camera 105 is illustrated, other sensors can readily be used to provide the tracking and/or location information. Further, although a single Camera 105 is depicted, in embodiments there may be any number of Cameras 105 (or other sensors) in the space.

Additionally, the illustrated example includes a Beacon 120 used to facilitate tracking of the Users 115. For example, the Beacon 120 may act as a receiver to detect user devices (e.g., smartphones) that are in proximity to the Beacon 120. In another embodiment, the Beacon 120 may act as a transmitter that is detected by user devices that are in proximity to the Beacon 120.

As illustrated the Environment 100 also includes a Server 125 that can be used to implement various aspects of the present disclosure. Although depicted as a physical Server 125, in embodiments, the operations can be implemented using virtual systems, physical systems, local devices, remote devices (e.g., cloud servers), and the like. The Server 125 includes a Tracking Component 130, Item Component 135, and Suggestion Component 140. Additionally, although illustrated as discrete components for conceptual clarity, in embodiments, the operations of the Tracking Component 130, Item Component 135, and Suggestion Component 140 may be combined or distributed across any number of components.

In one embodiment, the Tracking Component 130 can collect tracking information for one or more users in the space (e.g., customers in a retail environment) using one or more sensors, such as Cameras 105, Beacons 120, and the like. The Item Component 135 may evaluate the tracking information to identify item(s) that each monitored user may have selected. In an embodiment, the Suggestion Component 140 may be used to generate and maintain the curated and dynamic search results for each individual user. For example, when the User 115 interacts with a Kiosk 145 (or otherwise initiates a data search), the Suggestion Component 140 can evaluate the user's tracking information to generate a curated data set. Generally, the Kiosk 145 may correspond to any point of sale system where items are looked up, such as a self-checkout kiosk, a cashier-assisted checkout area, the user's own device (e.g., searching for an identifier via a smartphone), and the like.

The illustrated Environment 100 includes two sets of items or Objects 110A and 110B which the User 115 can select. Although two objects are depicted for conceptual clarity, there may of course be any number of objects in the space. For example, the Environment 100 may correspond to a produce section of a store, and the Objects 110A may be one type of apple while the Objects 110B are a second type.

Generally, using the Camera 105, Beacon 120, and/or other sensors, the Server 125 (e.g., via the Tracking Component 130) can collect information related to the movement and interactions of Users 115 in the Environment 100. For example, based on camera data and/or beacon data, the Server 125 (e.g., via the Item Component 135) may identify items that the user touched, items that the user walked past and/or lingered for at least some minimum time, and the like.

For example, based on the Beacon 120, the system may determine that the user lingered near the Objects 110B, rather than the Objects 110A. Similarly, based on image data from the Camera 105, the system may determine that the User 115 stood near, touched, picked up, or otherwise interacted with the Objects 110A, but did not touch the Objects 110B.

In at least one embodiment, determining whether the user interacted with or picked up an object may be determined based on the location of the user, rather than on conclusively identifying the object itself. For example, the Camera 105 may be used to determine that the User 115 stood near the Objects 110A (e.g., on the left side of the aisle) and reached for something from the shelves. In such an embodiment, the system can identify which object(s) are located at this location (or within a defined proximity), and thereby infer which object(s) the user may have selected without performing complex vision-based identification of the object itself. This can allow the system to facilitate item look up to only include (or to prioritize) items that the user may have selected. For example, the system may determine that the set of items located on the left of the illustrated aisle in proximity to the User 115 location are possible items, and therefore refrain from suggesting the Objects 110B (or other items on the right of the aisle).

In some aspects, the tracking information may also include additional detail beyond physical movement in the Environment 100. For example, to determine the location and/or price of an object, the User 115 may use a device (such as a smartphone) to scan one or more Objects 110, search for Objects 110, and the like. In some embodiments, the Server 125 (e.g., the Item Component 135) can also retrieve a list (e.g., a shopping list) authored by the user in order to determine which Object(s) 110 the User 115 likely selected. In at least one embodiment, the system can identify objects that the User 115 has checked, crossed off, or otherwise removed from the list.

In embodiments, based on such tracking information, the Server 125 can filter, sort, or otherwise curate a list of items presented to the User 115 (or to another user aiding the User 115, such as an employee performing checkout). For example, the Server 125 (e.g., via the Suggestion Component 140) may retrieve a set of all items available in the Environment 100 and identify, based on the first tracking information, a subset of items that the User 115 may have selected. The Suggestion Component 140 can then filter and/or sort the set of items based on the identified subset, such as by removing at least one item that is not included in the subset, placing items in the subset nearer to the top of the list, and the like. The curated list can then be provided, allowing for faster and more efficient data lookup.

In some embodiments, the Suggestion Component 140 can further use user input to refine the list. For example, after providing a curated list (e.g., a filtered list of possible item identifiers) and receiving a selection of a given item identifier (e.g., receiving an indication that the User 115 is selecting or purchasing a corresponding item), the Suggestion Component 140 may further filter the list by removing the selected item (or item identifier) from the curated list. Advantageously, when a user subsequently requests to search or lookup an item, the Suggestion Component 140 may use the existing curated list (which may have one or more items removed, if the user has already selected them), preventing waste of computational resource and further reducing latency of the data lookup process.

In embodiments, the Server 125 uses unique tracking information for each User 115. That is, when an item lookup or search request is received, the system can identify and use tracking information corresponding to the particular user making the request (or the user being assisted). This allows the Server 125 to return personalized and dynamic data lists to each user based on their own movements and interactions in the Environment 100.

Figure 2:
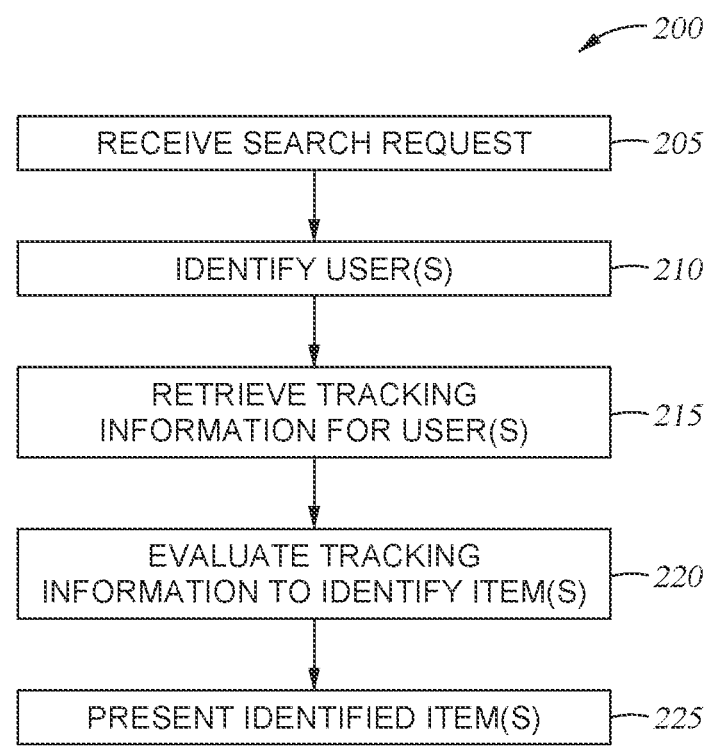
FIG. 2 is a flow diagram illustrating a method for improving data lookup based on user tracking information, according to one embodiment disclosed herein.

FIG. 2 is a flow diagram illustrating a method 200 for improving data lookup based on user tracking information, according to one embodiment disclosed herein.

The method 200 begins at block 205, where a computing system (e.g., the Server 125 of FIG. 1) receives a search request. The search request can generally include any request or indication to lookup, retrieve, search for, or otherwise identify an object. For example, the search request may include a request to determine a unique identifier (e.g., a price lookup or PLU code) of an item being purchased or selected.

In various embodiments, the search request can include manual input (e.g., pressing a button on a user interface), verbal input (e.g., using oral commands to initiate the data lookup), and the like. In some embodiments, the search request can include some data to narrow or control the search. For example, the search request may specify a type or category of item (e.g., "search for apples").

The method 200 then continues to block 210, where the computing system identifies one or more user(s) associated with the request. In various embodiments, the computing system may use a variety of techniques to identify the corresponding user(s). Such techniques may include, for example, facial recognition of the user, receiving input from the user identifying themselves (e.g., via a unique identifier such as a phone number), and the like.

In some embodiments, identifying the relevant user(s) includes identifying the user that initiated the search request. For example, at a self-checkout kiosk (such as Kiosk 145 of FIG. 1), the computing system may identify the user that is checking out. In at least one embodiment, identifying the user includes identifying a person for whom the request was initiated. For example, if a cashier initiates the search to look up an item for a customer, the computing system may identify the customer (rather than the cashier).

In some embodiments, the computing system can identify multiple users associated with the transaction. For example, in one such embodiment, two or more users can each select items in the environment, and the computing system can track each such user. The tracking information for each can be used to aid the checkout process, as discussed above.

Once the user (or users) has been identified, the method 200 continues to block 215, where the computing system retrieves the tracking information associated with the identified user(s). In embodiments, this tracking information generally comprises information relating to the movements and/or interactions of the user(s) in the physical space.

In some embodiments, the tracking information includes information identifying physical movements of the user (e.g., where they walked and/or lingered, how long they lingered in each place, and the like). Based on this information, the computing system may identify which item(s) the user may have selected. For example, if the user did not walk past a given item, the computing system may determine that the user (likely) did not select it. If the user lingered in a location for some predefined minimum time, the computing system may determine that the user selected (or may have selected) one or more items that are also located in that location.

In some embodiments, the tracking information can further include data relating to interactions of the user, such as items that they picked up or touched, items that they placed in their cart or other receptacle, and the like.

In at least one embodiment, the tracking information can include data relating to items that the user scanned and/or searched for (e.g., using a smartphone), items on a list authored by the user (e.g., a shopping list), items checked off or otherwise removed from the list, and the like.

At block 220, the computing system evaluates the received tracking information to identify a list of possible item(s) that the user may have selected. In some aspects, this can include determining unique item identifiers of each such item. For example, the computing system may determine that the user selected (or may have selected) organic apples, and further determine the unique identifier (e.g., the PLU code) of organic apples.

In some embodiments, if the search request included some narrowing information, the computing system can consider this narrowing information when evaluating the tracking information. For example, if the request specified to add "apples," the computing system can identify all items reflected in the tracking information, and filter this set of items based on the indicated information (e.g., retaining only the apples that are included in the list of possible items).

At block 225, the computing system can present the list of identified item(s) to the user. Advantageously, the computing system may refrain from providing the entire set of items available in the space. For example, if the user requested to add apples, the computing system may return a list including only the specific types of apples that are reflected in the tracking information (e.g., apples that the user walked past and/or picked up), rather than all possible apples (e.g., including apples the user did not walk past).

In some embodiments, in addition to or rather than filtering the list, the computing system can sort the list of items. That is, the computing system may sort the returned list such that the items reflected in the tracking information are located first, while still allowing the user to select other items by presenting them relatively lower in the list.

By generating and providing such dynamic and curated lists, the computing system can ensure that each individual user receives customized results for their search requests based on their individual tracking information. This can substantially reduce inaccuracies and delay required to perform the data look up, improving the efficiency and throughput of the system.

Figure 3:
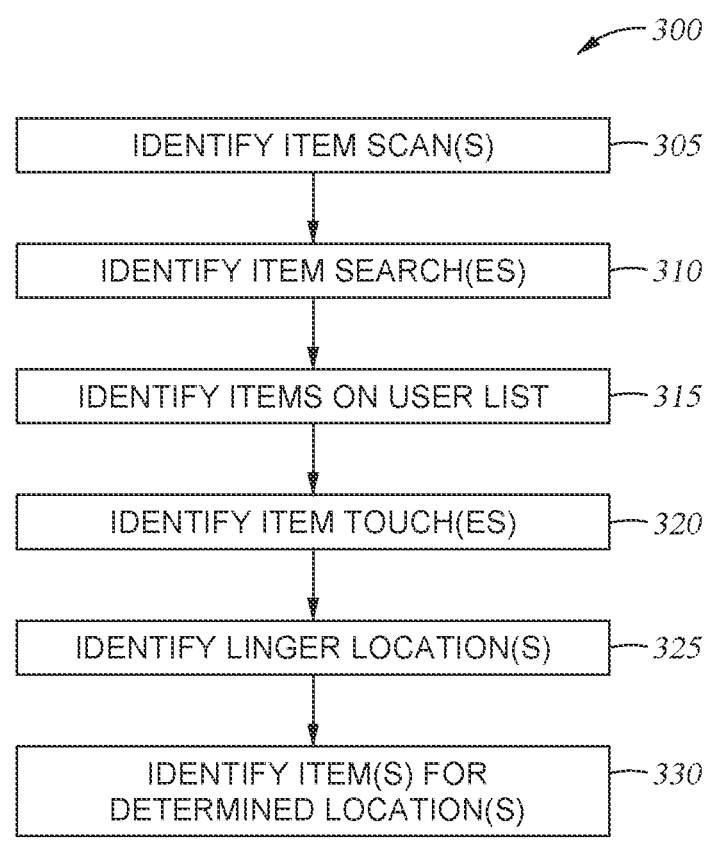
FIG. 3 is a flow diagram illustrating a method for collecting tracking information to facilitate improved data lookup, according to one embodiment disclosed herein.

FIG. 3 is a flow diagram illustrating a method 300 for collecting tracking information to facilitate improved data lookup, according to one embodiment disclosed herein. In some embodiments, the method 300 provides additional detail for block 220 in FIG. 2, where a computing system (e.g., the Server 125 of FIG. 1) identifies possible items based on tracking information.

In embodiments, the method 300 may be performed at various times, including when a search request is initiated, in real-time as data is received, periodically, and the like.

The method 300 begins at block 305, where the computing system identifies item scan(s) performed by the user. For example, if the user uses a device (such as their smartphone) to scan items, the computing system may record each such scan and identify the corresponding item.

At block 310, the computing system identifies item search(es) for the user. For example, the user may search for one or more items (e.g., via an application associated with the retail environment) to receive additional information for the item (such as its location in the space, nutritional facts, recipe ideas, and the like). In an embodiment, the computing system can identify each such search as part of evaluating the tracking information.

At block 315, the computing system identifies any item(s) specified on a list authored by the user. For example, the user may provide their shopping list (or use an application associated with the environment to maintain their list). In such an embodiment, the computing system can identify item(s) on this list in order to predict which item(s) the user may select. In at least one embodiment, identifying items on the list further includes identifying items that have been checked, crossed out, removed, or otherwise marked as "selected" or "complete."

At block 320, the computing system identifies item touch(es) for the user. For example, based on images collected from one or more cameras, the computing system can identify items that the user touched, picked up, and/or placed in their receptacle. In some embodiments, this includes identifying the movement of the user's arms and/or hands. Based on the location of the user at the time, the computing system may infer which item(s) the user interacted with. In at least one embodiment, this includes using a vision-based image recognition system to identify the item.

At block 325, the computing system identifies any linger location(s) in the tracking information. In some embodiments, the computing system can identify all location(s) and/or regions of the space that the user occupied or passed through. In at least one embodiment, to identify linger areas, the computing system can identify areas where the user remained for at least one minimum dwell time. Such linger areas may be more likely to correspond to items that the user selected (e.g., because they were looking through the items to select fresh produce).

At block 330, the computing system can identify the item(s) associated with any identified linger locations (or any other locations that the user occupied or passed through).

In this way, the computing system can use a variety of techniques in order to identify items that the user may have selected. This can allow the computing system to generate dynamic and customized menus or lists (e.g., via a graphical user interface or GUI) that reduces inaccuracy and latency of using the system.

Figure 4:
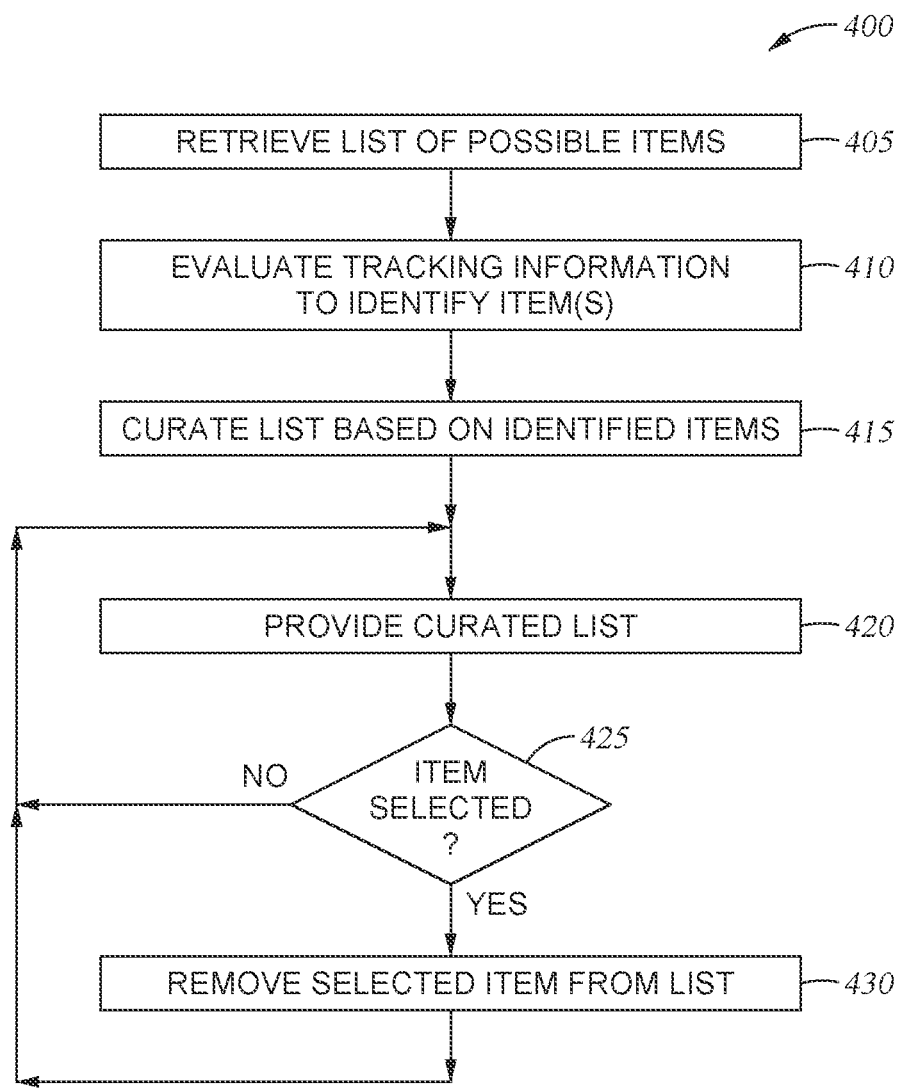
FIG. 4 is a flow diagram illustrating a method for filtering data based on user tracking information, according to one embodiment disclosed herein.

FIG. 4 is a flow diagram illustrating a method 400 for iteratively filtering data based on user tracking information, according to one embodiment disclosed herein.

The method 400 begins at block 405, where a computing system (e.g., the Server 125 of FIG. 1) retrieves a list of possible items. In some embodiments, this includes identifying all items available in the environment (or all items that are associated with and can be found using the lookup system). For example, the computing system may retrieve a list of items that can be purchased but that do not have traditional barcodes (such as produce). However, rather than simply presenting all such items to the user (as traditional systems do), the computing system can dynamically curate the list.

At block 410, the computing system evaluates tracking information associated with the user, as discussed above, in order to identify a subset of the item(s) that the user may have actually selected.

At block 415, the computing system can filter, sort, or otherwise curate the retrieved list based on the identified items from the tracking information.

In at least one embodiment, curating the list includes sorting the list such that items reflected in the tracking information are located first, while items not reflected in the tracking information are located relatively further down. In some embodiments, the computing system may filter the list to include only items reflected in the tracking information. In one such embodiment, the computing system may allow the user to manually request to review the remaining items (e.g., if the item they are searching for is not found in the identified subset).

At block 420, the computing system provides the curated list to the user. The method 400 then continues to block 425, where the computing system determines whether one or more item(s) have been selected from the curated list. In some embodiments, this includes determining whether the user indicated that a particular item corresponds to the item they were searching for.

In at least one embodiment, the user may specify that a particular item will not be selected. For example, if the tracking information includes one or more items that the user interacted with (but did not select and/or does not plan to purchase), the user may strike or remove these items to indicate that they are not looking for (and will not look for) these items.

If no items have been selected, the method 400 returns to continue providing the curated list and awaiting user input. If an item has been selected, the method 400 continues to block 430.

At block 430, the computing system removes any selected items from the curated list. This can allow the computing system to dynamically update the list as the transaction progresses. For example, if the user subsequently initiates another search request, the computing system can return this dynamic list (with previously-selected items removed) to further improve the efficiency of the process. The method 400 then returns to block 420.

Figure 5:
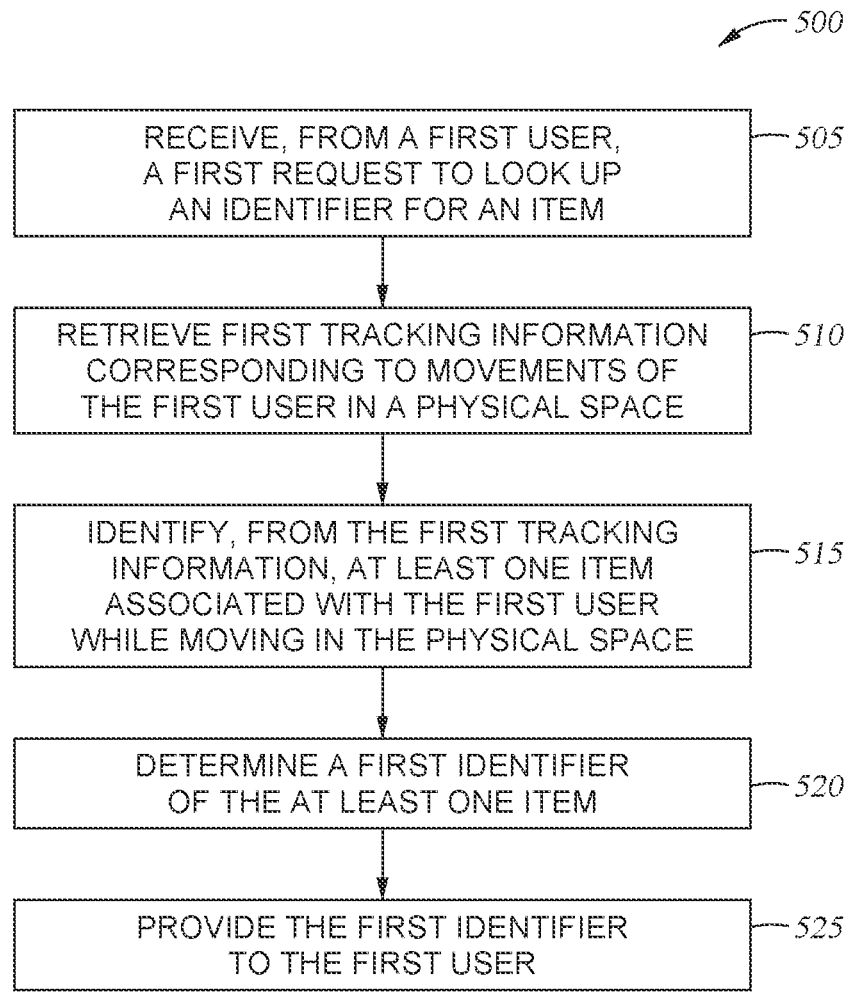
FIG. 5 is a flow diagram illustrating a method for determining and providing accurate item identifiers based on tracking information, according to one embodiment disclosed herein.

FIG. 5 is a flow diagram illustrating a method 500 for determining and providing accurate item identifiers based on tracking information, according to one embodiment disclosed herein.

At block 505, a computing system receives, from a first user, a first request to look up an identifier for an item. In one embodiment, the computing system is the Server 125 of FIG. 1.

In some embodiments, the method 500 further includes gathering the first tracking information using at least one of: (i) one or more cameras, (ii) one or more beacons, or (iii) a mobile application on a device of the first user.

At block 510, the computing system retrieves first tracking information corresponding to movements of the first user in a physical space.

At block 515, the computing system identifies, from the first tracking information, at least one item associated with the first user while moving in the physical space.

In some embodiments, identifying, from the first tracking information, at least one item comprises determining interactions of the first user in the physical space, comprising at least one of: identifying items scanned by the first user; identifying items searched for by the first user; or identifying items on a list authored by the first user.

In some embodiments, determining interactions of the first user further comprises: identifying items touched by the first user; identifying items that the first user walked past; identifying one or more locations where the first user lingered for at least a minimum time; and identifying one or more items located at the one or more locations.

At block 520, the computing system determines a first identifier of the at least one item.

At block 525, the computing system provides the first identifier to the first user.

In some embodiments, the method 500 further includes retrieving a set of items available in the physical space; identifying, from the first tracking information, a plurality of items; filtering the set of items based on the identified plurality of items by removing at least one item not included in the identified plurality of items; and providing the filtered set of items to the first user.

In some embodiments, the first request to look up the identifier of the item specifies a category of the item, and retrieving the set of items comprises retrieving identifiers for items belonging to the category.

In some embodiments, the method 500 further includes receiving a selection of the first identifier, wherein the first identifier corresponds to a first item; and removing the first item from the filtered set of items.

In some embodiments, the method 500 further includes receiving, from a second user, a second request to look up an identifier for an item; retrieving second tracking information corresponding to movements of the second user in a physical space; and identifying, from the second tracking information, at least one item associated with the second user while moving in the physical space.

Figure 6:
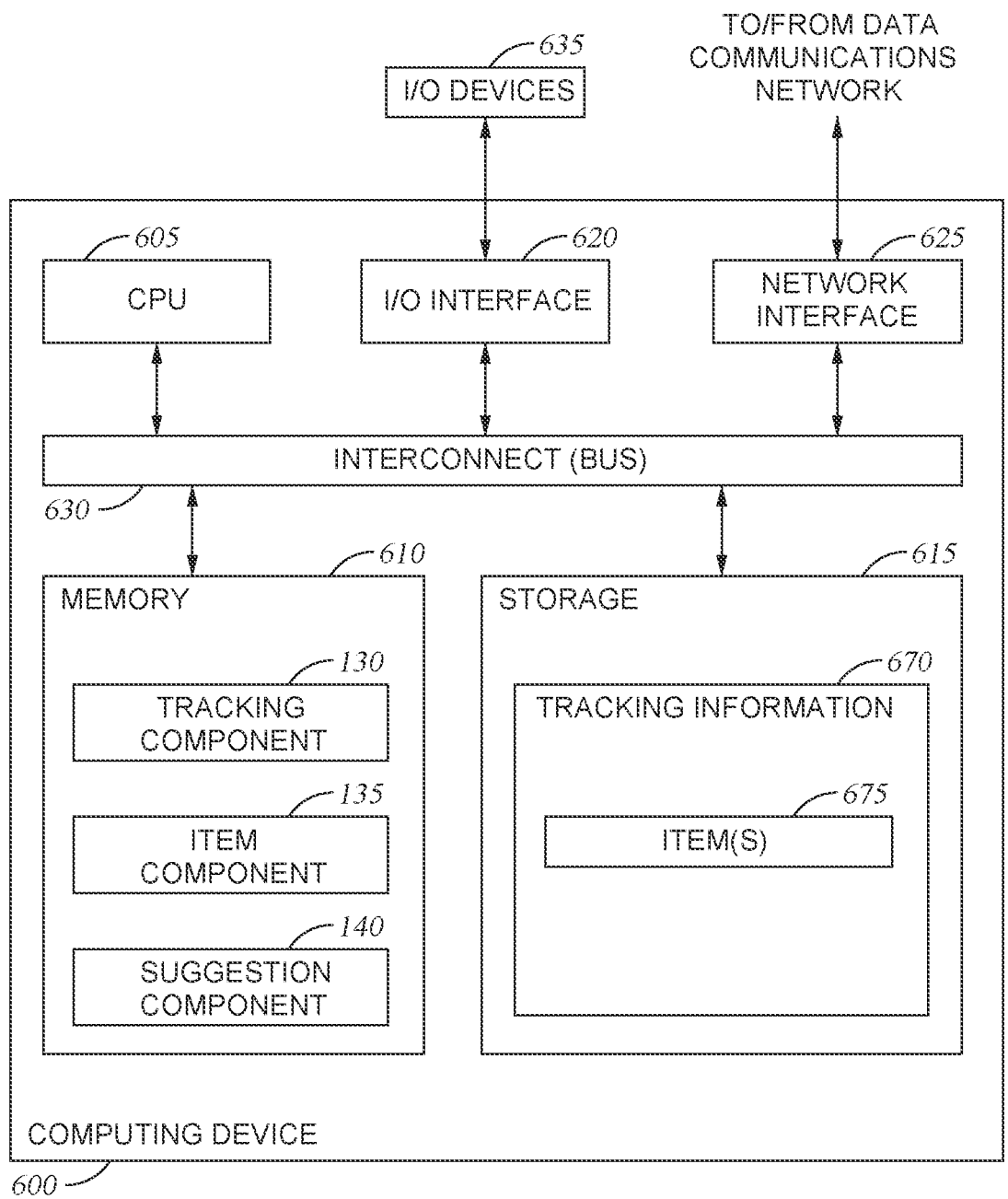
FIG. 6 is a block diagram depicting a computing device configured to provide improved data lookup based on tracking information, according to one embodiment disclosed herein.

FIG. 6 is a block diagram depicting a Computing Device 600 configured to provide improved data lookup based on tracking information, according to one embodiment disclosed herein. In one embodiment, the Computing Device 600 corresponds to the Server 125. Although depicted as a physical device, in embodiments, the Computing Device 600 may be implemented using virtual device(s), and/or across a number of devices (e.g., in a cloud environment). As illustrated, the Computing Device 600 includes a CPU 605, Memory 610, Storage 615, a Network Interface 625, and one or more I/O Interfaces 620. In the illustrated embodiment, the CPU 605 retrieves and executes programming instructions stored in Memory 610, as well as stores and retrieves application data residing in Storage 615. The CPU 605 is generally representative of a single CPU and/or GPU, multiple CPUs and/or GPUs, a single CPU and/or GPU having multiple processing cores, and the like. The Memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 635 (such as keyboards, monitors, etc.) are connected via the I/O Interface(s) 620. Further, via the Network Interface 625, the Computing Device 600 can be communicatively coupled with one or more other devices and components (e.g., via a network, which may include the Internet, local network(s), and the like). As illustrated, the CPU 605, Memory 610, Storage 615, Network Interface(s) 625, and I/O Interface(s) 620 are communicatively coupled by one or more Buses 630.

In the illustrated embodiment, the Storage 615 includes Tracking Information 670 for one or more users. Although depicted as residing in Storage 615, in embodiments, the Tracking Information 670 may reside in any suitable location. In an embodiment, the Tracking Information 670 includes data relating to the movements and/or interactions of a user in a physical space, such as locations they walked and/or lingered, items they searched for, and the like. In the illustrated example, the Tracking Information 670 includes a set of Items 675 that the user may have selected, as discussed above.

In the illustrated embodiment, the Memory 610 includes a Tracking Component 130, an Item Component 135, and a Suggestion Component 140, which may be configured to perform one or more embodiments discussed above.

For example, in one embodiment, the Tracking Component 130 can collect tracking information for one or more users in the space (e.g., customers in a retail environment) using one or more sensors, such as cameras, beacons, and the like. The Item Component 135 may evaluate the tracking information to identify item(s) that each monitored user may have selected. In an embodiment, the Suggestion Component 140 may be used to generate and maintain the curated and dynamic search results for each individual user, as discussed above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the Tracking Component 130, Item Component 135, and/or Suggestion Component 140 could execute on a computing system in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
capturing, by one or more camera devices, one or more images indicative of movements of a first user in a physical space;
receiving, from the first user, a first request to look up an identifier for an item;
accessing a list comprising a plurality of items available in the physical space;
retrieving first tracking information corresponding to the movements of the first user in the physical space and interactions of the first user with a mobile application on a mobile device of the first user, wherein:
the first tracking information is based at least in part on the one or more images, and
the interactions of the first user with the mobile application comprise the first user crossing out one or more items from a shopping list;
sorting one or more of the plurality of items in the list iteratively based on the first tracking information to generate a sorted list, wherein items reflected in the first tracking information are positioned nearer to a top of the sorted list relative to items not reflected in the first tracking information;
providing the sorted list to the first user; and
in response to receiving the first request:
identifying, based on the first tracking information, at least one item associated with the first user from the plurality of items;
determining a first identifier of the at least one item; and
providing the first identifier to the first user in response to identifying at least one item from the first tracking information.

2. The method of claim 1, wherein the first request is provided at a self-checkout point of sale system.

3. The method of claim 1, further comprising:
gathering the first tracking information using at least one of: (i) one or more cameras, (ii) one or more beacons, or (iii) a mobile application on a device of the first user.

4. The method of claim 1, wherein identifying, from the first tracking information, at least one item comprises determining interactions of the first user in the physical space, comprising at least one of:
identifying items scanned by the first user;
identifying items searched for by the first user; or
identifying items on a list authored by the first user.

5. The method of claim 4, wherein the interactions of the first user further comprise:
identifying items touched by the first user; or
identifying items that the first user walked past.

6. The method of claim 4, wherein determining interactions of the first user further comprises:
identifying one or more locations where the first user lingered for at least a minimum time; and
identifying one or more items located at the one or more locations.

7. The method of claim 1, further comprising:
retrieving a set of items available in the physical space, wherein the set of items correspond to objects for sale and the physical space corresponds to a retail environment;
identifying, from the first tracking information, a plurality of items;
filtering the set of items based on the identified plurality of items by removing at least one item not included in the identified plurality of items; and
providing the filtered set of items to the first user.

8. The method of claim 7, further comprising:
receiving a selection of the first identifier, wherein the first identifier corresponds to a first item; and
removing the first item from the filtered set of items.

9. The method of claim 7, wherein the first request to look up the identifier of the item specifies a category of the item, and retrieving the set of items comprises retrieving identifiers for items belonging to the category.

10. The method of claim 1, further comprising:
receiving, from a second user, a second request to look up an identifier for an item;
retrieving second tracking information corresponding to movements of the second user in a physical space; and
identifying, from the second tracking information, at least one item associated with the second user while moving in the physical space.

11. A non-transitory computer-readable storage medium containing computer program code that, when executed by operation of one or more computer processors, performs an operation comprising:
capturing, by one or more camera devices, one or more images indicative of movements of a first user in a physical space;
receiving, from the first user, a first request to look up an identifier for an item;
accessing a list comprising a plurality of items available in the physical space;
retrieving first tracking information corresponding to the movements of the first user in the physical space and interactions of the first user with a mobile application on a mobile device of the first user, wherein:
the first tracking information is based at least in part on the one or more images, and
the interactions of the first user with the mobile application comprise the first user crossing out one or more items from a shopping list;

sorting one or more of the plurality of items in the list iteratively based on the first tracking information to generate a sorted list, wherein items reflected in the first tracking information are positioned nearer to a top of the sorted list relative to items not reflected in the first tracking information;

providing the sorted list to the first user; and in response to receiving the first request:
  identifying, based on the first tracking information, at least one item associated with the first user from the plurality of items;
  determining a first identifier of the at least one item; and
  providing the first identifier to the first user in response to identifying at least one item from the first tracking information.

12. The non-transitory computer-readable storage medium of claim 11, the operation further comprising:
  gathering the first tracking information using at least one of: (i) one or more cameras, (ii) one or more beacons, or (iii) a mobile application on a device of the first user.

13. The non-transitory computer-readable storage medium of claim 11, wherein identifying, from the first tracking information, at least one item comprises determining interactions of the first user in the physical space, comprising at least one of:
  identifying items scanned by the first user;
  identifying items searched for by the first user;
  identifying items on a list authored by the first user;
  identifying items touched by the first user;
  identifying items that the first user walked past;
  identifying one or more locations where the first user lingered for at least a minimum time; or
  identifying one or more items located at the one or more locations.

14. The non-transitory computer-readable storage medium of claim 11, the operation further comprising:
  retrieving a set of items available in the physical space, wherein the set of items correspond to objects for sale and the physical space corresponds to a retail environment;
  identifying, from the first tracking information, a plurality of items;
  filtering the set of items based on the identified plurality of items by removing at least one item not included in the identified plurality of items; and
  providing the filtered set of items to the first user.

15. The non-transitory computer-readable storage medium of claim 11, the operation further comprising:
  receiving, from a second user, a second request to look up an identifier for an item;
  retrieving second tracking information corresponding to movements of the second user in a physical space; and
  identifying, from the second tracking information, at least one item associated with the second user while moving in the physical space.

16. A system comprising:
  one or more computer processors; and
  a memory containing a program which when executed by the one or more computer processors performs an operation, the operation comprising:
    capturing, by one or more camera devices, one or more images indicative of movements of a first user in a physical space;
    receiving, from the first user, a first request to look up an identifier for an item;
    accessing a list comprising a plurality of items available in the physical space;
    retrieving first tracking information corresponding to the movements of the first user in the physical space and interactions of the first user with a mobile application on a mobile device of the first user, wherein:
      the first tracking information is based at least in part on the one or more images, and
      the interactions of the first user with the mobile application comprise the first user crossing out one or more items from a shopping list;
    sorting one or more of the plurality of items in the list iteratively based on the first tracking information to generate a sorted list, wherein items reflected in the first tracking information are positioned nearer to a top of the sorted list relative to items not reflected in the first tracking information;
    providing the sorted list to the first user; and
    in response to receiving the first request:
      identifying, based on the first tracking information, at least one item associated with the first user from the plurality of items;
      determining a first identifier of the at least one item; and
      providing the first identifier to the first user in response to identifying at least one item from the first tracking information.

17. The system of claim 16, the operation further comprising:
  gathering the first tracking information using at least one of: (i) one or more cameras, (ii) one or more beacons, or (iii) a mobile application on a device of the first user.

18. The system of claim 16, wherein identifying, from the first tracking information, at least one item comprises determining interactions of the first user in the physical space, comprising at least one of:
  identifying items scanned by the first user;
  identifying items searched for by the first user;
  identifying items on a list authored by the first user;
  identifying items touched by the first user;
  identifying items that the first user walked past;
  identifying one or more locations where the first user lingered for at least a minimum time; or
  identifying one or more items located at the one or more locations.

19. The system of claim 16, the operation further comprising:
  retrieving a set of items available in the physical space, wherein the set of items correspond to objects for sale and the physical space corresponds to a retail environment;
  identifying, from the first tracking information, a plurality of items;
  filtering the set of items based on the identified plurality of items by removing at least one item not included in the identified plurality of items; and
  providing the filtered set of items to the first user.

20. The system of claim 16, the operation further comprising:
  receiving, from a second user, a second request to look up an identifier for an item;
  retrieving second tracking information corresponding to movements of the second user in a physical space; and
  identifying, from the second tracking information, at least one item associated with the second user while moving in the physical space.

* * * * *

UNITED STATES PATENT AND TRADEMARK OFFICE
CERTIFICATE OF CORRECTION

| | | |
|---|---|---|
| PATENT NO. | : 11,842,376 B2 | Page 1 of 1 |
| APPLICATION NO. | : 17/359502 | |
| DATED | : December 12, 2023 | |
| INVENTOR(S) | : Adrian Rodriguez et al. | |

It is certified that error appears in the above-identified patent and that said Letters Patent is hereby corrected as shown below:

In the Specification

In Column 4, Line 26, delete "1108." and insert -- 110B. --.

In Column 4, Line 43, delete "1108" and insert -- 110B --.

Signed and Sealed this
Thirteenth Day of August, 2024

*Katherine Kelly Vidal*

Katherine Kelly Vidal
*Director of the United States Patent and Trademark Office*